(12) United States Patent
Miller et al.

(10) Patent No.: US 9,635,480 B2
(45) Date of Patent: Apr. 25, 2017

(54) SPEAKER IMPEDANCE MONITORING

(71) Applicant: Cirrus Logic, Inc., Austin, TX (US)

(72) Inventors: Antonio John Miller, Austin, TX (US); Jie Su, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 15/195,785

(22) Filed: Jun. 28, 2016

(65) Prior Publication Data

US 2016/0309270 A1 Oct. 20, 2016

Related U.S. Application Data

(63) Continuation-in-part of application No. 13/844,602, filed on Mar. 15, 2013.

(51) Int. Cl.
*H04R 29/00* (2006.01)
*G06F 3/16* (2006.01)
*H04R 3/00* (2006.01)

(52) U.S. Cl.
CPC ........... *H04R 29/001* (2013.01); *G06F 3/165* (2013.01); *H04R 3/005* (2013.01); *H04R 2410/05* (2013.01); *H04R 2460/01* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 5,044,373 | A | 9/1991 | Northeved et al. |
| 5,251,263 | A | 10/1993 | Andrea et al. |
| 5,278,913 | A | 1/1994 | Delfosse et al. |
| 5,321,759 | A | 6/1994 | Yuan |

(Continued)

FOREIGN PATENT DOCUMENTS

| DE | 102011013343 A1 | 9/2012 |
|---|---|---|
| EP | 1880699 A2 | 1/2008 |

(Continued)

OTHER PUBLICATIONS

U.S. Appl. No. 13/721,832, Lu et al.

(Continued)

*Primary Examiner* — Paul Huber
(74) *Attorney, Agent, or Firm* — Norton Rose Fulbright US LLP

(57) ABSTRACT

A speaker impedance may be determined by monitoring a voltage and/or current of the speaker. The calculated impedance may be used to determine whether the mobile device containing the speaker is on- or off-ear. The impedance determination may be assisted by applying a test tone low level signal to the speaker. The test tone may be inaudible to the user, but used to determine an impedance of the speaker at the frequency of the test tone. The impedance at that test tone may be used to determine whether a resonance frequency of the speaker is at a frequency corresponding to an on- or off-ear condition. The measured speaker impedance may be provided as feedback to an adaptive noise cancellation (ANC) algorithm to adjust the output at the speaker. For example, when the mobile device is removed from the user's ear, the ANC algorithm may be disabled.

20 Claims, 8 Drawing Sheets

(56) References Cited

U.S. PATENT DOCUMENTS

| | | |
|---|---|---|
| 5,337,365 A | 8/1994 | Hamabe et al. |
| 5,359,662 A | 10/1994 | Yuan et al. |
| 5,410,605 A | 4/1995 | Sawada et al. |
| 5,425,105 A | 6/1995 | Lo et al. |
| 5,445,517 A | 8/1995 | Kondou et al. |
| 5,465,413 A | 11/1995 | Enge et al. |
| 5,548,681 A | 8/1996 | Gleaves et al. |
| 5,586,190 A | 12/1996 | Trantow et al. |
| 5,640,450 A | 6/1997 | Watanabe |
| 5,699,437 A | 12/1997 | Finn |
| 5,706,344 A | 1/1998 | Finn |
| 5,740,256 A | 4/1998 | Castello Da Costa et al. |
| 5,768,124 A | 6/1998 | Stothers et al. |
| 5,815,582 A | 9/1998 | Claybaugh et al. |
| 5,832,095 A | 11/1998 | Daniels |
| 5,946,391 A | 8/1999 | Dragwidge et al. |
| 5,991,418 A | 11/1999 | Kuo |
| 6,041,126 A | 3/2000 | Terai et al. |
| 6,118,878 A | 9/2000 | Jones |
| 6,219,427 B1 | 4/2001 | Kates et al. |
| 6,278,786 B1 | 8/2001 | McIntosh |
| 6,282,176 B1 | 8/2001 | Hemkumar |
| 6,418,228 B1 | 7/2002 | Terai et al. |
| 6,434,246 B1 | 8/2002 | Kates et al. |
| 6,434,247 B1 | 8/2002 | Kates et al. |
| 6,522,746 B1 | 2/2003 | Marchok et al. |
| 6,683,960 B1 | 1/2004 | Fujii et al. |
| 6,766,292 B1 | 7/2004 | Chandran et al. |
| 6,768,795 B2 | 7/2004 | Feltstrom et al. |
| 6,850,617 B1 | 2/2005 | Weigand |
| 6,940,982 B1 | 9/2005 | Watkins |
| 7,058,463 B1 | 6/2006 | Ruha et al. |
| 7,103,188 B1 | 9/2006 | Jones |
| 7,181,030 B2 | 2/2007 | Rasmussen et al. |
| 7,330,739 B2 | 2/2008 | Somayajula |
| 7,365,669 B1 | 4/2008 | Melanson |
| 7,680,456 B2 | 3/2010 | Muhammad et al. |
| 7,742,790 B2 | 6/2010 | Konchitsky et al. |
| 7,817,808 B2 | 10/2010 | Konchitsky et al. |
| 8,019,050 B2 | 9/2011 | Mactavish et al. |
| D666,169 S | 8/2012 | Tucker et al. |
| 8,249,262 B2 | 8/2012 | Chua et al. |
| 8,251,903 B2 | 8/2012 | LeBoeuf et al. |
| 8,290,537 B2 | 10/2012 | Lee et al. |
| 8,325,934 B2 | 12/2012 | Kuo |
| 8,379,884 B2 | 2/2013 | Horibe et al. |
| 8,401,200 B2 | 3/2013 | Tiscareno et al. |
| 8,442,251 B2 | 5/2013 | Jensen et al. |
| 8,526,627 B2 | 9/2013 | Asao et al. |
| 8,848,936 B2 | 9/2014 | Kwatra et al. |
| 8,907,829 B1 | 12/2014 | Naderi |
| 8,908,877 B2 | 12/2014 | Abdollahzadeh Milani et al. |
| 8,948,407 B2 | 2/2015 | Alderson et al. |
| 8,958,571 B2 | 2/2015 | Kwatra et al. |
| 9,094,744 B1 | 7/2015 | Lu et al. |
| 9,230,532 B1 | 1/2016 | Lu et al. |
| 9,319,784 B2 | 4/2016 | Lu et al. |
| 9,324,311 B1 | 4/2016 | Abdollahzadeh Milani et al. |
| 9,325,821 B1 | 4/2016 | Hendrix et al. |
| 9,344,792 B2 * | 5/2016 | Rundle ............... H04R 1/1083 |
| 9,369,557 B2 | 6/2016 | Kaller et al. |
| 9,369,798 B1 | 6/2016 | Alderson et al. |
| 2001/0053228 A1 | 12/2001 | Jones |
| 2002/0003887 A1 | 1/2002 | Zhang et al. |
| 2003/0063759 A1 | 4/2003 | Brennan et al. |
| 2003/0185403 A1 | 10/2003 | Sibbald |
| 2004/0047464 A1 | 3/2004 | Yu et al. |
| 2004/0165736 A1 | 8/2004 | Hetherington et al. |
| 2004/0167777 A1 | 8/2004 | Hetherington et al. |
| 2004/0202333 A1 | 10/2004 | Csermak et al. |
| 2004/0264706 A1 | 12/2004 | Ray et al. |
| 2005/0004796 A1 | 1/2005 | Trump et al. |
| 2005/0018862 A1 | 1/2005 | Fisher |
| 2005/0117754 A1 | 6/2005 | Sakawaki |
| 2005/0207585 A1 | 9/2005 | Christoph |
| 2005/0240401 A1 | 10/2005 | Ebenezer |
| 2006/0035593 A1 | 2/2006 | Leeds |
| 2006/0069556 A1 | 3/2006 | Nadjar et al. |
| 2006/0153400 A1 | 7/2006 | Fujita et al. |
| 2007/0030989 A1 | 2/2007 | Kates |
| 2007/0033029 A1 | 2/2007 | Sakawaki |
| 2007/0038441 A1 | 2/2007 | Inoue et al. |
| 2007/0047742 A1 | 3/2007 | Taenzer et al. |
| 2007/0053524 A1 | 3/2007 | Haulick et al. |
| 2007/0076896 A1 | 4/2007 | Hosaka et al. |
| 2007/0154031 A1 | 7/2007 | Avendano et al. |
| 2007/0258597 A1 | 11/2007 | Rasmussen et al. |
| 2007/0297620 A1 | 12/2007 | Choy |
| 2008/0019548 A1 | 1/2008 | Avendano |
| 2008/0101589 A1 | 5/2008 | Horowitz et al. |
| 2008/0107281 A1 | 5/2008 | Togami et al. |
| 2008/0144853 A1 | 6/2008 | Sommerfeldt et al. |
| 2008/0177532 A1 | 7/2008 | Greiss et al. |
| 2008/0181422 A1 | 7/2008 | Christoph |
| 2008/0226098 A1 | 9/2008 | Haulick et al. |
| 2008/0240455 A1 | 10/2008 | Inoue et al. |
| 2008/0240457 A1 | 10/2008 | Inoue et al. |
| 2009/0012783 A1 | 1/2009 | Klein |
| 2009/0034748 A1 | 2/2009 | Sibbald |
| 2009/0041260 A1 | 2/2009 | Jorgensen et al. |
| 2009/0046867 A1 | 2/2009 | Clemow |
| 2009/0060222 A1 | 3/2009 | Jeong et al. |
| 2009/0080670 A1 | 3/2009 | Solbeck et al. |
| 2009/0086990 A1 | 4/2009 | Christoph |
| 2009/0175466 A1 | 7/2009 | Elko et al. |
| 2009/0196429 A1 | 8/2009 | Ramakrishnan et al. |
| 2009/0220107 A1 | 9/2009 | Every et al. |
| 2009/0238369 A1 | 9/2009 | Ramakrishnan et al. |
| 2009/0245529 A1 | 10/2009 | Asada et al. |
| 2009/0254340 A1 | 10/2009 | Sun et al. |
| 2009/0290718 A1 | 11/2009 | Kahn et al. |
| 2009/0296965 A1 | 12/2009 | Kojima |
| 2009/0304200 A1 | 12/2009 | Kim et al. |
| 2009/0311979 A1 | 12/2009 | Husted et al. |
| 2010/0014683 A1 | 1/2010 | Maeda et al. |
| 2010/0014685 A1 | 1/2010 | Wurm |
| 2010/0061564 A1 | 3/2010 | Clemow et al. |
| 2010/0069114 A1 | 3/2010 | Lee et al. |
| 2010/0082339 A1 | 4/2010 | Konchitsky et al. |
| 2010/0098263 A1 | 4/2010 | Pan et al. |
| 2010/0098265 A1 | 4/2010 | Pan et al. |
| 2010/0124336 A1 | 5/2010 | Shridhar et al. |
| 2010/0124337 A1 | 5/2010 | Wertz et al. |
| 2010/0131269 A1 | 5/2010 | Park et al. |
| 2010/0150367 A1 | 6/2010 | Mizuno |
| 2010/0158330 A1 | 6/2010 | Guissin et al. |
| 2010/0166203 A1 | 7/2010 | Peissig et al. |
| 2010/0195838 A1 | 8/2010 | Bright |
| 2010/0195844 A1 | 8/2010 | Christoph et al. |
| 2010/0207317 A1 | 8/2010 | Iwami et al. |
| 2010/0239126 A1 | 9/2010 | Grafenberg et al. |
| 2010/0246855 A1 | 9/2010 | Chen |
| 2010/0266137 A1 | 10/2010 | Sibbald et al. |
| 2010/0272276 A1 | 10/2010 | Carreras et al. |
| 2010/0272283 A1 | 10/2010 | Carreras et al. |
| 2010/0274564 A1 | 10/2010 | Bakalos et al. |
| 2010/0284546 A1 | 11/2010 | DeBrunner et al. |
| 2010/0291891 A1 | 11/2010 | Ridgers et al. |
| 2010/0296666 A1 | 11/2010 | Lin |
| 2010/0296668 A1 | 11/2010 | Lee et al. |
| 2010/0310086 A1 | 12/2010 | Magrath et al. |
| 2010/0322430 A1 | 12/2010 | Isberg |
| 2011/0007907 A1 | 1/2011 | Park et al. |
| 2011/0106533 A1 | 5/2011 | Yu |
| 2011/0116643 A1* | 5/2011 | Tiscareno ............ H04R 1/1016 |
| | | 381/58 |
| 2011/0129098 A1 | 6/2011 | Delano et al. |
| 2011/0130176 A1 | 6/2011 | Magrath et al. |
| 2011/0142247 A1 | 6/2011 | Fellers et al. |
| 2011/0144984 A1 | 6/2011 | Konchitsky |
| 2011/0158419 A1 | 6/2011 | Theverapperuma et al. |
| 2011/0206214 A1 | 8/2011 | Christoph et al. |
| 2011/0222698 A1 | 9/2011 | Asao et al. |
| 2011/0249826 A1 | 10/2011 | Van Leest |

(56) References Cited

U.S. PATENT DOCUMENTS

| | | |
|---|---|---|
| 2011/0288860 A1 | 11/2011 | Schevciw et al. |
| 2011/0293103 A1 | 12/2011 | Park et al. |
| 2011/0299695 A1 | 12/2011 | Nicholson |
| 2011/0305347 A1 | 12/2011 | Wurm |
| 2011/0317848 A1 | 12/2011 | Ivanov et al. |
| 2012/0135787 A1 | 5/2012 | Kusunoki et al. |
| 2012/0140917 A1 | 6/2012 | Nicholson et al. |
| 2012/0140942 A1 | 6/2012 | Loeda |
| 2012/0140943 A1 | 6/2012 | Hendrix et al. |
| 2012/0148062 A1 | 6/2012 | Scarlett et al. |
| 2012/0155666 A1 | 6/2012 | Nair |
| 2012/0170766 A1 | 7/2012 | Alves et al. |
| 2012/0207317 A1 | 8/2012 | Abdollahzadeh Milani et al. |
| 2012/0207319 A1* | 8/2012 | Tsuchiya ............... H03G 9/025 381/74 |
| 2012/0215519 A1 | 8/2012 | Park et al. |
| 2012/0250873 A1 | 10/2012 | Bakalos et al. |
| 2012/0259626 A1 | 10/2012 | Li et al. |
| 2012/0263317 A1 | 10/2012 | Shin et al. |
| 2012/0281850 A1 | 11/2012 | Hyatt |
| 2012/0300958 A1 | 11/2012 | Klemmensen |
| 2012/0300960 A1 | 11/2012 | Mackay et al. |
| 2012/0308021 A1 | 12/2012 | Kwatra et al. |
| 2012/0308024 A1 | 12/2012 | Alderson et al. |
| 2012/0308025 A1 | 12/2012 | Hendrix et al. |
| 2012/0308026 A1 | 12/2012 | Kamath et al. |
| 2012/0308027 A1 | 12/2012 | Kwatra |
| 2012/0308028 A1 | 12/2012 | Kwatra et al. |
| 2012/0310640 A1 | 12/2012 | Kwatra et al. |
| 2013/0010982 A1 | 1/2013 | Elko et al. |
| 2013/0083939 A1 | 4/2013 | Fellers et al. |
| 2013/0243198 A1 | 9/2013 | Van Rumpt |
| 2013/0243225 A1 | 9/2013 | Yokota |
| 2013/0272539 A1 | 10/2013 | Kim et al. |
| 2013/0287218 A1 | 10/2013 | Alderson et al. |
| 2013/0287219 A1 | 10/2013 | Hendrix et al. |
| 2013/0301842 A1 | 11/2013 | Hendrix et al. |
| 2013/0301846 A1 | 11/2013 | Alderson et al. |
| 2013/0301847 A1 | 11/2013 | Alderson et al. |
| 2013/0301848 A1 | 11/2013 | Zhou et al. |
| 2013/0301849 A1 | 11/2013 | Alderson et al. |
| 2013/0343556 A1 | 12/2013 | Bright |
| 2013/0343571 A1 | 12/2013 | Rayala et al. |
| 2014/0044275 A1 | 2/2014 | Goldstein et al. |
| 2014/0050332 A1 | 2/2014 | Nielsen et al. |
| 2014/0086425 A1 | 3/2014 | Jensen et al. |
| 2014/0177851 A1 | 6/2014 | Kitazawa et al. |
| 2014/0211953 A1 | 7/2014 | Alderson et al. |
| 2014/0226827 A1 | 8/2014 | Abdollahzadeh Milani |
| 2014/0270208 A1 | 9/2014 | Miller et al. |
| 2014/0270222 A1 | 9/2014 | Hendrix et al. |
| 2014/0270223 A1 | 9/2014 | Li et al. |
| 2014/0270224 A1 | 9/2014 | Zhou et al. |
| 2014/0314246 A1 | 10/2014 | Hellman |
| 2015/0092953 A1 | 4/2015 | Abdollahzadeh Milani et al. |
| 2015/0104032 A1 | 4/2015 | Kwatra et al. |
| 2015/0161980 A1 | 6/2015 | Alderson et al. |
| 2015/0163592 A1 | 6/2015 | Alderson |

FOREIGN PATENT DOCUMENTS

| | | |
|---|---|---|
| EP | 1947642 A1 | 7/2008 |
| EP | 2133866 A1 | 12/2009 |
| EP | 2216774 A1 | 8/2010 |
| EP | 2395500 A1 | 12/2011 |
| EP | 2395501 A1 | 12/2011 |
| EP | 2712209 A1 | 3/2014 |
| EP | 2890160 A1 | 7/2015 |
| GB | 2401744 A | 11/2004 |
| GB | 2455821 A | 6/2009 |
| GB | 2455824 A | 6/2009 |
| GB | 2455828 A | 6/2009 |
| GB | 2484722 A | 4/2012 |
| JP | H06186985 A | 7/1994 |
| WO | WO-03015074 A1 | 2/2003 |
| WO | WO-03015275 A1 | 2/2003 |
| WO | WO-2004009007 A1 | 1/2004 |
| WO | WO-2004017303 A1 | 2/2004 |
| WO | WO-2007007916 A1 | 1/2007 |
| WO | WO-2007113487 A1 | 10/2007 |
| WO | 2008/000304 A1 | 1/2008 |
| WO | WO-2010117714 A1 | 10/2010 |
| WO | WO-2012134874 A1 | 10/2012 |

OTHER PUBLICATIONS

U.S. Appl. No. 13/968,013, Abdollahzadeh Milani et al.

U.S. Appl. No. 14/210,589, Abdollahzadeh Milani et al.

Abdollahzadeh Milani, et al., "On Maximum Achievable Noise Reduction in ANC Systems",2010 IEEE International Conference on Acoustics Speech and Signal Processing, Mar. 14-19, 2010, pp. 349-352, Dallas, TX, US.

Akhtar, et al., "A Method for Online Secondary Path Modeling in Active Noise Control Systems," IEEE International Symposium on Circuits and Systems, May 23-26, 2005, pp. 264-267, vol. 1, Kobe, Japan.

Benet et al., Using infrared sensors for distance measurement in mobile roots, Robotics and Autonomous Systems, 2002, vol. 40, pp. 255-266.

Black, John W., "An Application of Side-Tone in Subjective Tests of Microphones and Headsets", Project Report No. NM 001 064. 01.20, Research Report of the U.S. Naval School of Aviation Medicine, Feb. 1, 1954, 12 pages (pp. 1-12 in pdf), Pensacola, FL, US.

Booij, et al., "Virtual sensors for local, three dimensional, broadband multiple-channel active noise control and the effects on the quiet zones", Proceedings of the International Conference on Noise and Vibration Engineering, ISMA 2010, Sep. 20-22, 2010, pp. 151-166, Leuven.

Campbell, Mikey, "Apple looking into self-adjusting earbud headphones with noise cancellation tech", Apple Insider, Jul. 4, 2013, pp. 1-10 (10 pages in pdf), downloaded on May 14, 2014 from http://appleinsider.com/articles/13/07/04/apple-looking-into-self-adjusting-earbud-headphones-with-noise-cancellation-tech.

Cohen, Israel, "Noise Spectrum Estimation in Adverse Environments: Improved Minima Controlled Recursive Averaging", IEEE Transactions on Speech and Audio Processing, Sep. 2003, pp. 1-11, vol. 11, Issue 5, Piscataway, NJ, US.

Cohen, et al., "Noise Estimation by Minima Controlled Recursive Averaging for Robust Speech Enhancement", IEEE Signal Processing Letters, Jan. 2002, pp. 12-15, vol. 9, No. 1, Piscataway, NJ, US.

Davari, et al., "A New Online Secondary Path Modeling Method for Feedforward Active Noise Control Systems," IEEE International Conference on Industrial Technology, Apr. 21-24, 2008, pp. 1-6, Chengdu, China.

Erkelens, et al., "Tracking of Nonstationary Noise Based on Data-Driven Recursive Noise Power Estimation", IEEE Transactions on Audio Speech and Language Processing, Aug. 2008, pp. 1112-1123, vol. 16, No. 6, Piscataway, NJ, US.

Feng, Jinwei et al., "A broadband self-tuning active noise equaliser", Signal Processing, Elsevier Science Publishers B.V. Amsterdam, NL, vol. 62, No. 2, Oct. 1, 1997, pp. 251-256.

Gao, et al., "Adaptive Linearization of a Loudspeaker," IEEE International Conference on Acoustics, Speech, and Signal Processing, Apr. 14-17, 1991, pp. 3589-3592, Toronto, Ontario, CA.

Hurst, et al., "An improved double sampling scheme for switched-capacitor delta-sigma modulators", 1992 IEEE Int. Symp. On Circuits and Systems, May 10-13, 1992, vol. 3, pp. 1179-1182, San Diego, CA.

Jin, et al. "A simultaneous equation method-based online secondary path modeling algorithm for active noise control", Journal of Sound and Vibration, Apr. 25, 2007, pp. 455-474, vol. 303, No. 3-5, London, GB.

Johns, et al., "Continuous-Time LMS Adaptive Recursive Filters," IEEE Transactions on Circuits and Systems, Jul. 1991, pp. 769-778, vol. 38, No. 7, IEEE Press, Piscataway, NJ.

(56) References Cited

OTHER PUBLICATIONS

Kates, James M., "Principles of Digital Dynamic Range Compression," Trends in Amplification, Spring 2005, pp. 45-76, vol. 9, No. 2, Sage Publications.

Kuo, et al., "Active Noise Control: A Tutorial Review," Proceedings of the IEEE, Jun. 1999, pp. 943-973, vol. 87, No. 6, IEEE Press, Piscataway, NJ.

Kuo, et al., "Residual noise shaping technique for active noise control systems", J. Acoust. Soc. Am. 95 (3), Mar. 1994, pp. 1665-1668.

Lan, et al., "An Active Noise Control System Using Online Secondary Path Modeling With Reduced Auxiliary Noise," IEEE Signal Processing Letters, Jan. 2002, pp. 16-18, vol. 9, Issue 1, IEEE Press, Piscataway, NJ.

Lane, et al., "Voice Level: Autophonic Scale, Perceived Loudness, and the Effects of Sidetone", The Journal of the Acoustical Society of America, Feb. 1961, pp. 160-167, vol. 33, No. 2., Cambridge, MA, US.

Liu, et al., "Analysis of Online Secondary Path Modeling With Auxiliary Noise Scaled by Residual Noise Signal," IEEE Transactions on Audio, Speech and Language Processing, Nov. 2010, pp. 1978-1993, vol. 18, Issue 8, IEEE Press, Piscataway, NJ.

Liu, et al., "Compensatory Responses to Loudness-shifted Voice Feedback During Production of Mandarin Speech", Journal of the Acoustical Society of America, Oct. 2007, pp. 2405-2412, vol. 122, No. 4.

Lopez-Caudana, Edgar Omar, "Active Noise Cancellation: The Unwanted Signal and the Hybrid Solution", Adaptive Filtering Applications, Dr. Lino Garcia (Ed.), Jul. 2011, pp. 49-84, ISBN: 978-953-307-306-4, InTech.

Lopez-Gaudana, Edgar et al., "A hybrid active noise cancelling with secondary path modeling", 51st Midwest Symposium on Circuits and Systems, 2008, MWSCAS 2008, Aug. 10, 2008, pp. 277-280.

Mali, Dilip, "Comparison of DC Offset Effects on LMS Algorithm and its Derivatives," International Journal of Recent Trends in Engineering, May 2009, pp. 323-328, vol. 1, No. 1, Academy Publisher.

Martin, Rainer, "Noise Power Spectral Density Estimation Based on Optimal Smoothing and Minimum Statistics", IEEE Transactions on Speech and Audio Processing, Jul. 2001, pp. 504-512, vol. 9, No. 5, Piscataway, NJ, US.

Martin, Rainer, "Spectral Subtraction Based on Minimum Statistics", Signal Processing VII Theories and Applications, Proceedings of EUSIPCO-94, 7th European Signal Processing Conference, Sep. 13-16, 1994, pp. 1182-1185, vol. III, Edinburgh, Scotland, U.K.

Morgan, et al., A Delayless Subband Adaptive Filter Architecture, IEEE Transactions on Signal Processing, IEEE Service Center, Aug. 1995, pp. 1819-1829, vol. 43, No. 8, New York, NY, US.

Paepcke, et al., "Yelling in the Hall: Using Sidetone to Address a Problem with Mobile Remote Presence Systems", Symposium on User Interface Software and Technology, Oct. 16-19, 2011, 10 pages (pp. 1-10 in pdf), Santa Barbara, CA, US.

Parkins, John W., "Narrowband and broadband active control in an enclosure using the acoustic energy density" Acoustical Society of America, Jul. 2000, vol. 108, No. 1 pp. 192-203.

Peters, Robert W., "The Effect of High-Pass and Low-Pass Filtering of Side-Tone Upon Speaker Intelligibility", Project Report No. NM 001 064.01.25, Research Report of the U.S. Naval School of Aviation Medicine, Aug. 16, 1954, 13 pages (pp. 1-13 in pdf), Pensacola, FL, US.

Pfann, et al., "LMS Adaptive Filtering with Delta-Sigma Modulated Input Signals," IEEE Signal Processing Letters, Apr. 1998, pp. 95-97, vol. 5, No. 4, IEEE Press, Piscataway, NJ.

Rangachari, et al., "A noise-estimation algorithm for highly non-stationary environments", Speech Communication, Feb. 2006, pp. 220-231, vol. 48, No. 2. Elsevier Science Publishers.

Rao, et al., "A Novel Two State Single Channel Speech Enhancement Technique", India Conference (INDICON) 2011 Annual IEEE, IEEE, Dec. 2011, 6 pages (pp. 1-6 in pdf), Piscataway, NJ, US.

Ryan, et al., "Optimum Near-Field Performance of Microphone Arrays Subject to a Far-Field Beampattern Constraint", J. Acoust. Soc. Am., Nov. 2000, pp. 2248-2255, 108 (5), Pt. 1, Ottawa, Ontario, Canada.

Senderowicz, et al., "Low-Voltage Double-Sampled Delta-Sigma Converters", IEEE Journal on Solid-State Circuits, Dec. 1997, pp. 1907-1919, vol. 32, No. 12, Piscataway, NJ.

Shoval, et al., "Comparison of DC Offset Effects in Four LMS Adaptive Algorithms," IEEE Transactions on Circuits and Systems II: Analog and Digital Processing, Mar. 1995, pp. 176-185, vol. 42, Issue 3, IEEE Press, Piscataway, NJ.

Silva, et al., "Convex Combination of Adaptive Filters With Different Tracking Capabilities," IEEE International Conference on Acoustics, Speech, and Signal Processing, Apr. 15-20, 2007, pp. III 925-928, vol. 3, Honolulu, HI, USA.

Therrien, et al., "Sensory Attenuation of Self-Produced Feedback: The Lombard Effect Revisited", PLOS One, Nov. 2012, pp. 1-7, vol. 7, Issue 11, e49370, Ontario, Canada.

Toochinda, et al. "A Single-Input Two-Output Feedback Formulation for ANC Problems," Proceedings of the 2001 American Control Conference, Jun. 2001, pp. 923-928, vol. 2, Arlington, VA.

Widrow, B., et al., Adaptive Noise Cancelling; Principles and Applications, Proceedings of the IEEE, Dec. 1975, pp. 1692-1716, vol. 63, No. 13, IEEE, New York, NY, US.

Zhang, Ming et al., "A Robust Online Secondary Path Modeling Method with Auxiliary Noise Power Scheduling Strategy and Norm Constraint Manipulation", IEEE Transactions on Speech and Audio Processing, IEEE Service Center, New York, NY, vol. 11, No. 1, Jan. 1, 2003.

\* cited by examiner

SPEAKER IMPEDANCE MONITORING

CROSS-REFERENCE TO RELATED PATENT APPLICATIONS

This application is a continuation-in-part of U.S. patent application Ser. No. 13/844,602 to Miller et al. filed Mar. 15, 2013 and entitled "Monitoring of Speaker Impedance to Detect Pressure Applied Between Mobile Device and Ear," which is incorporated by reference herein.

FIELD OF THE DISCLOSURE

The instant disclosure relates to mobile devices. More specifically, this disclosure relates to audio output of mobile devices.

BACKGROUND

Mobile devices are carried by a user throughout most or all of a day. During the day, the user may encounter many different environments, each with a different background noise characteristic and other acoustic effects. Mobile devices employ noise cancelling to take into account the environmental changes and improve the user's experience while using the mobile device. However, the performance of noise cancelling systems vary with how closely a speaker of the mobile device is placed against the user's ear, because the coupling between the user's ear and the speaker varies with distance.

SUMMARY

An impedance of a speaker of a mobile device varies due to objects interfering with the speaker's acoustic radiation field. For example, when a user places the mobile device closer to the user's ear, the speaker impedance increases. The impedance may be calculated from voltage and/or current measurements obtained from the speaker using a test tone signal and/or using the playback of audio through the speaker. From the calculated impedance, a proximity of the speaker to other devices may be determined. For example, a mobile device may be determined to be on- or off-ear from the calculated impedance.

The mobile device may be controlled based on the determined impedance of the speaker and/or the detection of on- or off-ear condition. In one embodiment, adaptive noise cancellation (ANC) may be adjusted based on the impedance of the speaker and/or determination of an on- or off-ear condition. For example, when the phone is off-ear, the ANC may be disabled. In another example, the impedance of the speaker may be calculated by the mobile device to determine a pressure applied by the user between the mobile device and the user's ear. The impedance may be applied to an adaptive noise cancellation (ANC) circuit to adjust processing of an audio signal for playback through the speaker. The changes in impedance vary proportionally to the pressure applied by the user to place the mobile device against his ear and thus vary proportionally to a distance between the speaker and the user's ear canal. In one example, the impedance of a speaker may range from 5 ohms to 11 ohms depending on the pressure applied between the speaker and the user's ear.

According to one embodiment, a method may include calculating an impedance of a speaker of a mobile device. The method may also include determining a force applied by a user of the mobile device that causes contact between the mobile device and the user based, at least in part, on the calculated impedance. In certain embodiments, the impedance is an acoustic radiation impedance.

The method may also include applying a voltage to the speaker, and measuring a current through the speaker, in which the step of calculating the impedance comprises calculating the impedance based at least in part on the applied voltage and the measured current; adjusting an adaptive noise cancellation (ANC) algorithm based, at least in part, on the determined force; receiving an audio signal from an error microphone, in which the step of adjusting the ANC algorithm comprises adjusting the ANC algorithm based, at least in part, on the error microphone audio signal; and/or linearizing an output of the speaker based, at least in part, on the calculated impedance.

According to another embodiment, an apparatus may include a speaker. The apparatus may also include an amplifier coupled to the speaker. The apparatus may further include a processor coupled to the amplifier. The processor may be configured to execute the steps comprising calculating an impedance of the speaker and determining an environmental load of the speaker based, at least in part, on the calculated impedance.

In certain embodiments, the apparatus may be a mobile device; the environmental load may be proportional to a force, applied by a user of the mobile device, that causes contact between the mobile device and the user; the amplifier may be configured to apply a voltage to the speaker and measure a current through the speaker, and the processor may be configured to calculate the impedance based, at least in part, on the applied voltage and the measured current; the processor may be a digital signal processor (DSP) and the digital signal processor may be configured to adjust an adaptive noise cancellation (ANC) algorithm based, at least in part, on the determined force; and/or the processor may be further configured to linearize an output of the speaker based, at least in part, on the calculated impedance.

The apparatus may also include an error microphone coupled to the digital signal processor, in which the digital signal processor is further configured to adjust the ANC algorithm based, at least in part, on an audio signal received from the error microphone According to yet another embodiment, a computer program product includes a non-transitory computer readable medium comprising code to execute the steps comprising calculating an impedance of a speaker and determining an environmental load of the speaker based, at least in part, on the calculated impedance. In certain embodiments, the environmental load may be proportional to a force, applied by a user of the mobile device that causes contact between the mobile device and the user.

The medium may also include code to detect, based at least in part on the determined force, when the mobile device is removed from an ear of the user; code to adjust an adaptive noise cancellation (ANC) algorithm based, at least in part, on the determined force; and/or code to linearize an output of the speaker based, at least in part, on the calculated impedance.

According to one embodiment, a method may include receiving, at a processor, a voltage measurement and a current measurement from a speaker during output of audio by the speaker; calculating an impedance of the speaker based, at least in part, on the received voltage measurement and the received current measurement; and/or detecting, based at least in part on the calculated impedance, when the speaker is removed from an ear of the user.

In some embodiments, the method may also include outputting, by the processor, a test tone to the speaker at a first frequency before receiving the voltage measurement and the current measurement, wherein the step of calculating the impedance includes calculating the impedance of the speaker at the first frequency; the step of detecting when the speaker is removed from the ear of the user includes determining if the calculated impedance at the first frequency is above a threshold impedance; the step of calculating the impedance of the speaker may include applying a bandpass filter to the voltage measurement and the current measurement, wherein the bandpass filter is centered at the first frequency of the test tone; the step of calculating the impedance of the speaker may include applying a low pass filter to the result of bandpass filtering the voltage measurement and the current measurement; the step of calculating the impedance of the speaker may include dividing the result of the low pass filtering of the bandpass filtered voltage measurement by the result of the low pass filtering of the bandpass filtered current measurement; the step of detecting when the speaker is removed from the ear of the user comprises determining a change in an impedance curve of the speaker based, at least in part, on the received voltage measurement and the received current measurement; and/or the method may also include adjusting an adaptive noise cancellation (ANC) algorithm based, at least in part, on the calculated impedance, such as by disabling the adaptive noise cancellation (ANC) algorithm when the speaker is detected as removed from the ear of the user.

According to another embodiment, an apparatus may include a speaker, an amplifier coupled to the speaker, and a processor coupled to the amplifier, in which the processor is configured to perform steps including receiving, at a processor, a voltage measurement and a current measurement from a speaker during output of audio by the speaker; calculating an impedance of the speaker based, at least in part, on the received voltage measurement and the received current measurement; and/or detecting, based at least in part on the calculated impedance, when the speaker is removed from an ear of the user. In some embodiments of this apparatus, the processor may be configured to perform other steps described in this patent application.

According to a further embodiment, a computer program product may include a non-transitory computer readable medium comprising code to perform steps including receiving, at a processor, a voltage measurement and a current measurement from a speaker during output of audio by the speaker; calculating an impedance of the speaker based, at least in part, on the received voltage measurement and the received current measurement; and/or detecting, based at least in part on the calculated impedance, when the speaker is removed from an ear of the user. In some embodiments of this computer program product, the medium may include code to perform other steps described in this patent application.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
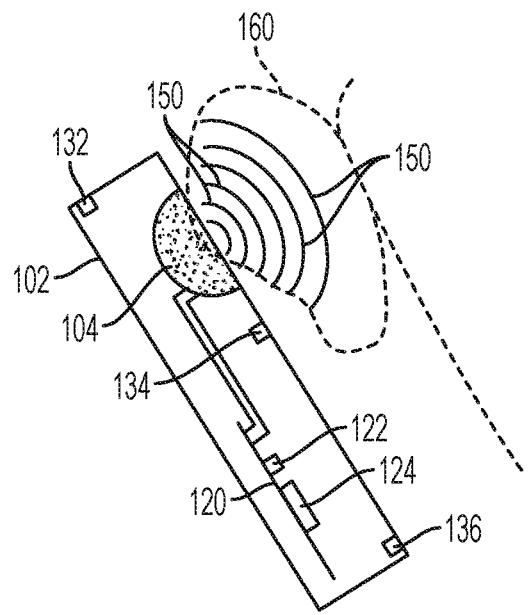
FIG. 1 is a cross-section illustrating a mobile device with speaker impedance monitoring according to one embodiment of the disclosure.

FIG. 1 is a cross-section illustrating a mobile device with speaker impedance monitoring according to one embodiment of the disclosure. A mobile device 102 may be placed near a user's ear 160. The mobile device 102 may be, for example, a mobile phone, a tablet computer, a laptop computer, or a wireless earpiece. The mobile device 102 may include a speaker 104, such as a transducer, driven by an amplifier 122 of a circuit 120. The speaker 104 may generate an acoustic sound field 150 near the mobile device 102. The user's ear 160 translates the acoustic sound field 150 into recognizable sounds for the user. For example, the acoustic sound field 150 may include speech conversations occurring during a phone call, playback of a voice mail message, playback of ring tones, and/or playback of audio or video files. The amplifier 122 may receive audio signals from a processor 124 of the circuit 120, such as a digital signal processor (DSP).

The mobile device 102 may also include a near-speech microphone 136, an error microphone 134, and a reference microphone 132. Each of the microphones 132, 134, and 136 receive audible sounds fields and translate the acoustic sound fields into electrical signals for processing by the circuit 120. For example, the near-speech microphone 136 may receive speech during a conversation occurring during a phone call. In another example, the error microphone 134 may receive the acoustic sound field 150 generated by the speaker 104. In a further example, the reference microphone 132 may be positioned away from a typical position of a user's mouth and may measure an ambient acoustic environment.

Figure 2:
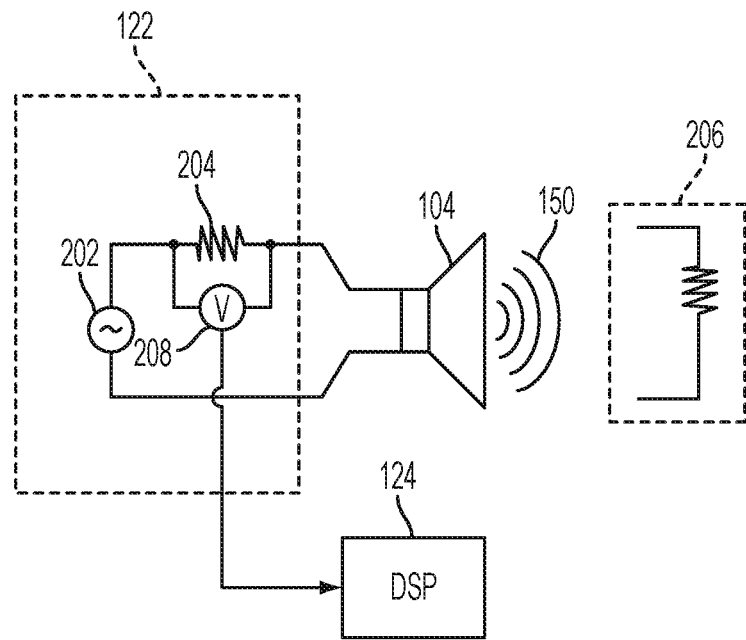
FIG. 2 is a block diagram illustrating speaker impedance monitoring according to one embodiment of the disclosure.

One apparatus for measuring a speaker impedance includes a resistor for measuring current. FIG. 2 is a block diagram illustrating speaker impedance monitoring according to one embodiment of the disclosure. The speaker 104 may be coupled to a voltage source 202 of the amplifier 122. The speaker 104 may have an impedance 206 proportional to loading of the acoustic sound field 150. A resistor 204 may be coupled in series with the speaker 104, such that a current passing through the resistor 204 is proportional to a current passing through the speaker 104. A voltmeter 208 may be coupled in parallel with the resistor 204 to measure a voltage across the resistor 204. The current passing through the resistor 204, and thus the speaker 104, may be calculated by multiplying the resistance value of the resistor 204 with the measured voltage at the voltmeter 208. The current may be calculated by a processor, such as the processor 124. The impedance 206 of the speaker 104 may be calculated, by the processor 124, from the voltage value at the voltage source 202, the resistance value of the resistor 204, and the voltage across the resistor 204 measured by the voltmeter 208.

The voltage at the speaker 104, $V_T$, may be calculated by dividing the voltage of the voltage source 202, $V_S$, across the resistor 204 and the speaker 104 according to a voltage ladder. For example, the impedance 206, $Z_L$, may be calculated from the current, I, through the resistor 204, and the value of the resistor 204, R.

Figure 3:
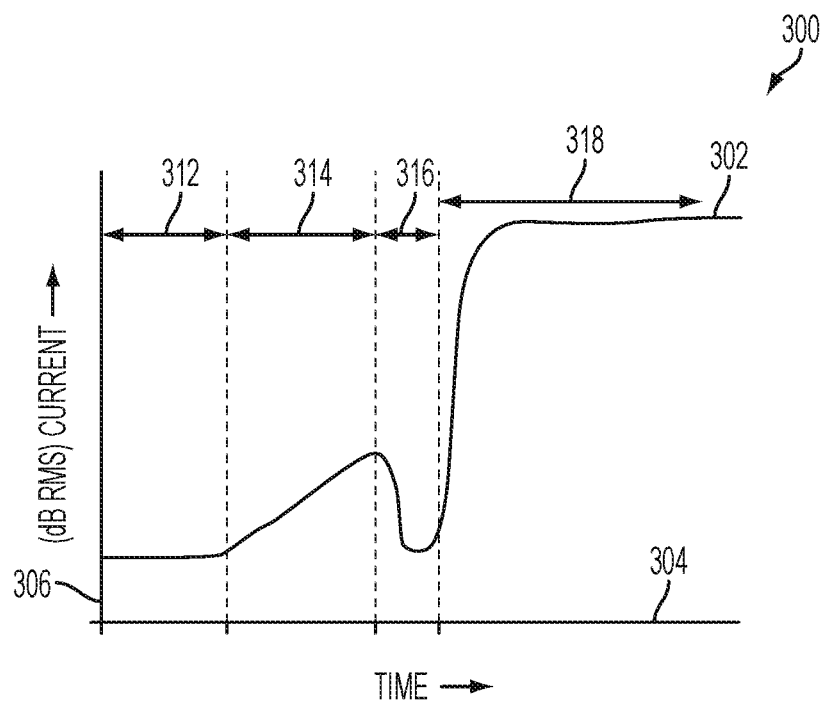
FIG. 3 is a graph illustrating speaker impedance over time based on various user placements of the mobile device according to one embodiment of the disclosure.

Speaker impedance, $Z_L$, varies with the pressure applied by the user to place the mobile device against the user's ear. FIG. 3 is a graph illustrating speaker impedance over time based on various user placements of the mobile device according to one embodiment of the disclosure. A graph 300 plots current on a y-axis 306 against time on an x-axis 304. The x-axis 304 is divided into time periods 312, 314, 316, and 318 illustrating different events determined by the speaker impedance. A current line 302 illustrates a baseline pressure applied during the time period 312. During the time period 314, the current line 302, and thus speaker impedance, increases proportional to increasing pressure applied by the user to place the mobile device against the user's ear. During time period 316, the user removes the mobile device from his/her ear resulting in a decrease in the current line 302, and thus speaker impedance. During a time period 318, the user places the mobile device on the user's cheek resulting in an increase in current, and thus speaker impedance.

Figure 4:
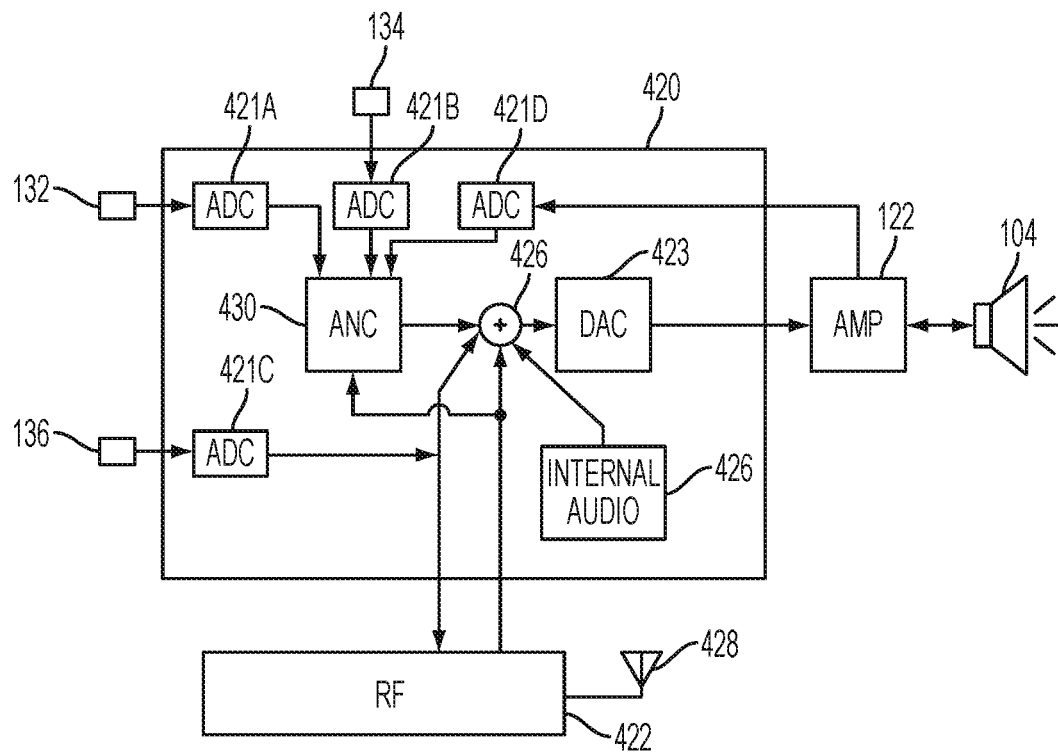
FIG. 4 is a block diagram illustrating a noise canceling system according to one embodiment of the disclosure.

A speaker impedance may be provided to an adaptive noise cancellation (ANC) system for adapting the noise control system. FIG. 4 is a block diagram illustrating a noise canceling system according to one embodiment of the disclosure. A circuit 420 may receive input from the microphones 132, 134, and 136. Analog values from the microphones 132, 134, and 136 may be converted by analog-to-digital converters (ADCs) 421A, 421B, and 421C. The ADCs 421A, 421B, and 421C may be part of the noise control system or may be built into the microphones 132, 134, and 136, respectively. In one embodiment, the microphones 132, 134, and 136 are digital microphones, and no ADCs are placed between the digital microphones and the circuit 420.

The circuit 420 may also receive input from the speaker 104, such as an impedance value of the speaker 104. The impedance value may be calculated by the amplifier 122 and output to an analog-to-digital converter 421D, which converts the impedance value to a digital value for ANC circuit 430. In one embodiment, the speaker impedance output by the amplifier 122 is a digital value, and no analog-to-digital converter is present.

The ANC circuit 430 may generate an anti-noise signal, which is provided to a combiner 426. The anti-noise signal may be adjusted according to a force, or distance, between the user's ear and the speaker 104. For example, the anti-noise signal may be disabled when the user removes the phone from the user's ear. The removal of the phone from the user's ear may be detected when the speaker impedance falls below a threshold value.

The combiner 426 combines the anti-noise signal from the ANC circuit 430 with sound from the near speech microphone 136, internal audio 426, and audio signals received wirelessly through an antenna 428 and processed by a radio frequency (RF) circuit 422. The internal audio 426 may be, for example, ringtones, audio files, and/or audio portions of video files. Audio signals received through the antenna 428 may be, for example, streamed analog or digital audio signals and/or telephone conversations. The combiner 426 provides a single signal to a digital-to-analog converter (DAC) 423. The DAC 423 converts the digital signal of the combiner 423 to an analog audio signal for amplification by the amplifier 122 and output at the speaker 104.

Figure 5:
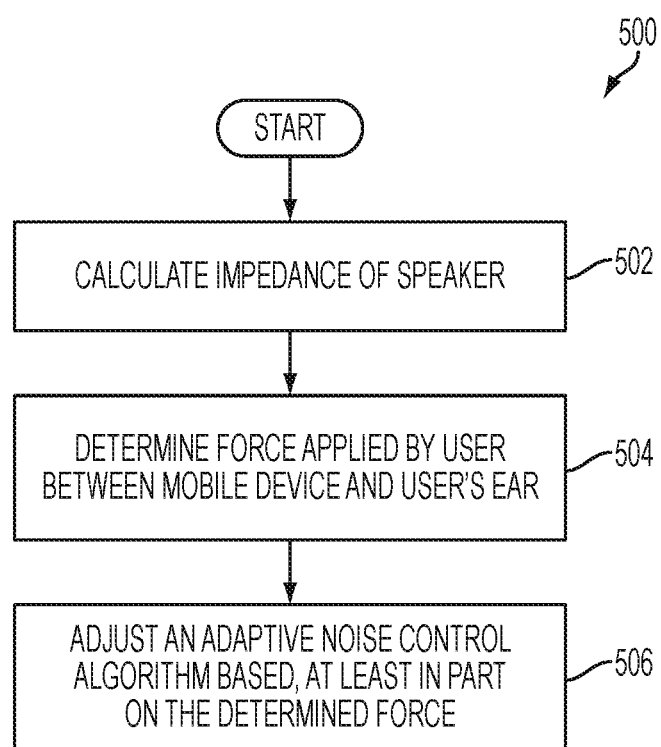
FIG. 5 is a flow chart illustrating a method for adaptive noise cancellation (ANC) in a mobile device according to one embodiment of the disclosure.

FIG. 5 is a flow chart illustrating a method for adaptive noise cancellation in a mobile device according to one embodiment of the disclosure. A method 500 begins at block 502 with calculating an impedance of a speaker. The speaker impedance may be calculated by monitoring a current through the speaker and calculating an impedance of the speaker based on a known voltage value driving the speaker. The current monitoring may be performed in real-time during playback of an audio signal, such as during a voice conversation or during playback of audio files.

At block 504, a force applied by the user between the mobile device and the user's ear may be determined from the calculated impedance. The impedance of the speaker is proportional to a loading of the speaker. Higher force applied by the user between the mobile device and the user's ear increases the load on the speaker, which appears as an increase in impedance of the speaker. The force applied by the user may be proportional to the distance between the speaker and the user's ear canal.

At block 506, an adaptive noise cancellation algorithm is adjusted based, at least in part, on the determined force at block 504. For example, a control oversight algorithm may determine from the determined force that the user has removed the mobile device from the user's ear. When the off-ear condition is detected, the adaptive noise cancellation algorithm may be disabled. In another example, feedback regarding the speaker impedance may be provided to an adaptive noise cancellation algorithm to adjust the output of a speaker to compensate for the user's ear position. For example, output to the speaker may be adjusted to obtain linearization of the speaker audio output at high sound pressure levels (SPLs).

Figure 6:
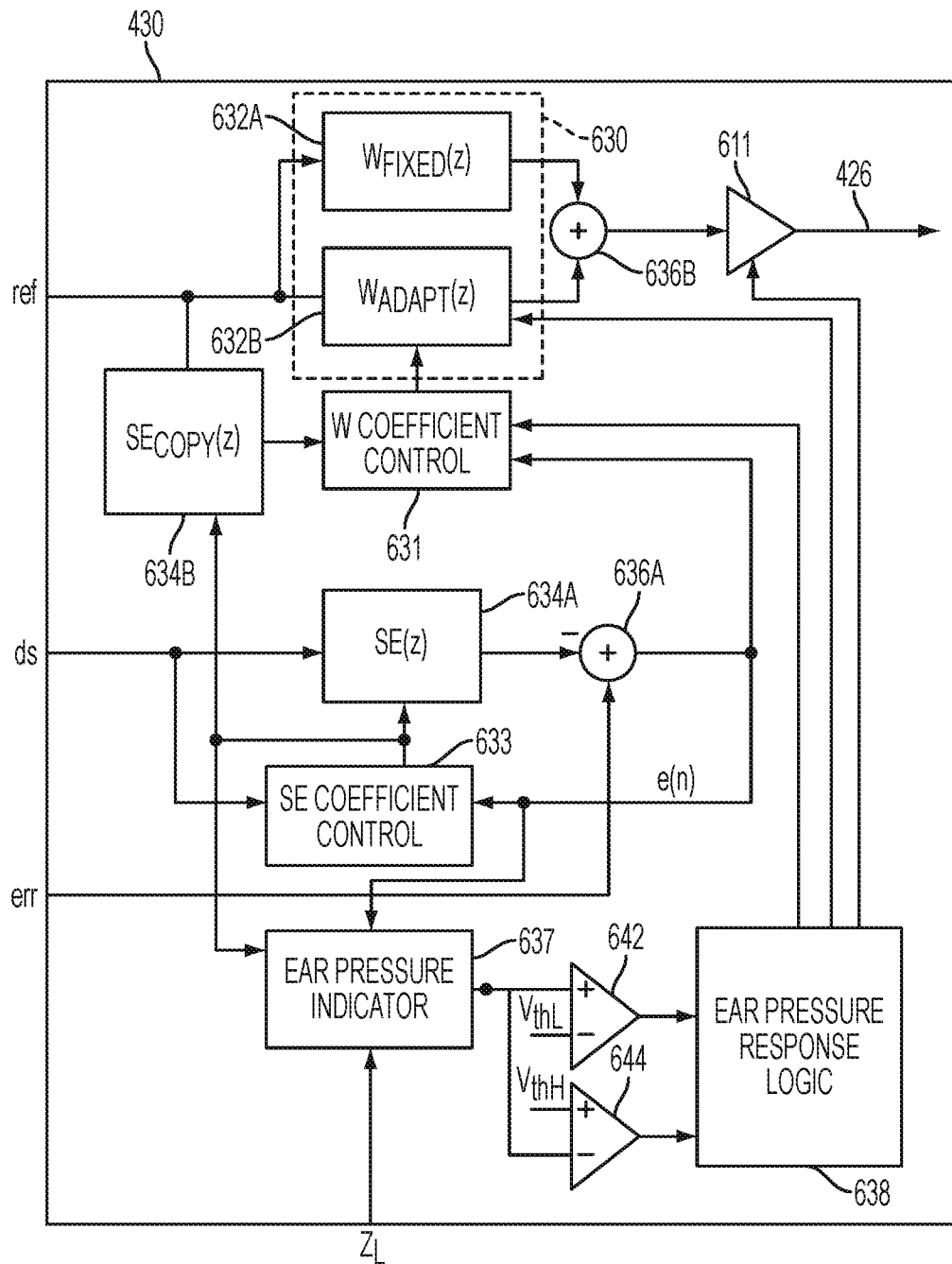
FIG. 6 is a block diagram of an adaptive noise cancellation (ANC) circuit according to one embodiment of the disclosure.

Additional details regarding the adaptive noise cancellation circuit are illustrated in FIG. 6. FIG. 6 is a block diagram of an adaptive noise cancellation circuit according to one embodiment of the disclosure. An adaptive filter 630 may be formed from a fixed filter 632A, having a response $W_{FIXED}(z)$, and an adaptive portion 632B, having a response $W_{ADAPT}(z)$ with outputs summed by a combiner 636B. The adaptive filter 630 may receive the reference microphone signal ref and may adapt a transfer function $W(z) = W_{FIXED}(z) + W_{ADAPT}(z)$ to generate an anti-noise signal, which is provided to the combiner 426 that combines the anti-noise signal with the audio to be reproduced by the speaker. The response $W(z)$ adapts to estimate a ratio $P(z)/S(z)$, where $S(z)$ is the response for an electro-acoustic path and $P(z)$ is the response for an acoustic path. A controllable amplifier circuit 611 mutes or attenuates the anti-noise signal under certain non-ideal conditions, such as when the anti-noise signal is expected to be ineffective or erroneous due to lack of a seal between the user's ear and mobile device.

The coefficients of adaptive filter 632B may be controlled by a W coefficient control block 631, which may use a correlation of two signals to determine the response of the adaptive filter 632B to reduce the energy of the error, such as calculated by a least-mean square function, between the components of the reference microphone signal ref that are present in the error microphone signal err. The signals compared by the W coefficient control block 631 may be the reference microphone signal ref as shaped by a copy of an estimate $SE_{COPY}(z)$ of the response of path $S(z)$ provided by filter 634B and an error signal e(n) formed by subtracting a modified portion of a downlink audio signal ds from the error microphone signal err. By transforming the reference microphone signal ref with a copy of the estimate of the response of path $S(z)$, $SE_{COPY}(z)$, and adapting the adaptive filter 632B to reduce the correlation between the resultant signal and the error microphone signal err, the adaptive filter 632B adapts to the desired response of $P(z)/S(z) - W_{FIXED}(z)$. Thus, response $W(z)$ adapts to $P(z)/S(z)$, resulting in a noise-cancelling error, which may be for example white noise.

The signal compared to the output of the filter 634B by the W coefficient control block 631 adds to the error microphone signal err an inverted amount of the downlink audio signal ds that is processed by the filter response 634A, $SE(z)$, of which response $SE_{COPY}(z)$ is a copy. By injecting an inverted amount of the downlink audio signal ds, the adaptive filter 632B may be prevented from adapting to the relatively large amount of downlink audio present in the error microphone signal err and by transforming that inverted copy of the downlink audio signal ds with the estimate of the response of path $S(z)$. The downlink audio that is removed from the error microphone signal err before comparison may match the expected version of the downlink audio signal ds reproduced at the error microphone signal err, because the electrical and acoustical path of $S(z)$ may be the path taken by the downlink audio signal ds to arrive at an error microphone. The filter 634B may have an adjustable response tuned to match the response of the adaptive filter 634A, such that the response of the filter 634B tracks the adapting of the adaptive filter 634A.

The adaptive filter 634A may include coefficients controlled by SE coefficient control block 633, which compares the downlink audio signal ds and the error microphone signal err after removal of the above-described filtered downlink audio signal ds that has been filtered by the adaptive filter 634A to represent the expected downlink audio delivered to an error microphone, and which has been removed from the output of the adaptive filter 634A by a combiner 636A. The SE coefficient control block 633 correlates the downlink speech signal ds with the components of downlink audio signal ds that are present in the error microphone signal err. The adaptive filter 634A is adapted to generate a signal from the downlink audio signal ds, and optionally the anti-noise signal combined by the combiner 636B during muting conditions, that when subtracted from the error microphone signal err, contains the content of error microphone signal err that is not due to the downlink audio signal ds. The overall energy of the error signal normalized to the overall energy of the response $SE(z)$ is related to the pressure between the user's ear and mobile device, which may be determined by calculating the speaker impedance described above with reference to FIG. 5.

In one embodiment, an ear pressure indicator 637 may determine the ratio between $|Ele(N)|$, which is the energy of the error signal generated by the combiner 636A and an overall magnitude of the response of $SE(z)$: $\Sigma|SEn(z)|$. Ear pressure indication $Ele(n)/\Sigma|SEn(z)|$ may be only one example function of e(n) and $SE_n(z)$ that may be used to yield a measure of ear pressure. For example, $\Sigma|SE_n(z)|$ or $\Sigma SE_n(z)^2$, which are a function of only $SE(z)$ may be alternatively used, because the response $SE(z)$ changes with ear pressure.

In another embodiment, the ear pressure indicator 637 may receive the speaker impedance measurement and calculate an ear pressure based, at least in part, on the speaker impedance. As described above with reference to FIG. 3, the speaker impedance may be used to determine a force applied by the user between the mobile device and the user's ear. That force may be entered into an algorithm to determine ear pressure. The ear pressure indicator 637 may implement calculation of ear pressure based on the speaker impedance, the error signal, and/or $SE(z)$.

The ear pressure indicator 637 may output a value, either digital or analog, proportional to the force applied by the user between the mobile device and the user's ear. A comparator 642 compares the output of the ear pressure indicator 637 with a first, low pressure, threshold $V_{th,L}$. If the output is below the threshold, indicating that ear pressure is below the normal operating range, such as when the mobile device is off the user's ear, then the ear pressure response logic 638 may be signaled to take action to prevent generation of undesirable anti-noise at the user's ear. Similarly, a comparator 644 compares the output of the ear pressure indicator 637 with a second, high pressure, threshold $V_{th,H}$, and if $Ele(n)/\Sigma|SEn(z)|$ is above the threshold, indicating that ear pressure is above the normal operating range, such as when the mobile device is pressed hard onto the user's ear, then the ear pressure response logic 638 may be signaled to take action to prevent generation of undesirable anti-noise at the user's ear.

Figure 7:
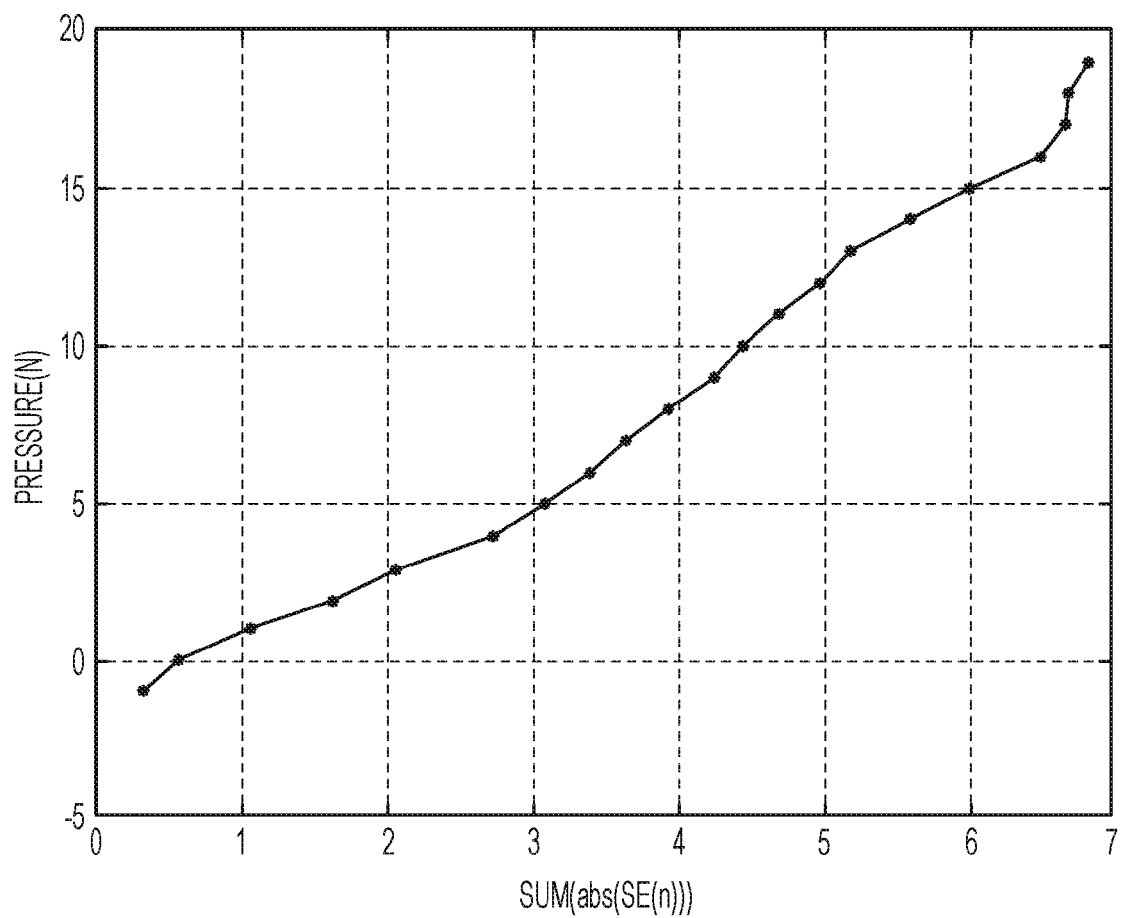
FIG. 7 is a graph of a response against pressure applied between the mobile device and the user's ear according to one embodiment of the disclosure.

FIG. 7 is a graph of a response against force between the mobile device and the user's ear according to one embodiment of the disclosure. As pressure increases between a mobile device and the user's ear, the response $SE(z)$ increases in magnitude, which indicates an improved electro-acoustic path $S(z)$, which is a measure of a degree of coupling between the speaker and the error microphone. A higher degree of coupling between the user's ear and the speaker is indicated when response $SE(z)$ increases in magnitude, and conversely, a lower degree of coupling between the user's ear and the speaker is indicated when response $SE(z)$ decreases in magnitude. Because the adaptive filter 632B of FIG. 6 adapts to the desired response of $P(z)/S(z)$, as ear pressure is increased and response $SE(z)$ increases in energy, less anti-noise is generated. Conversely, as the pressure between the ear and mobile device decreases, the anti-noise signal may increase in energy, because the user's ear is no longer highly coupled to the speaker and/or the error microphone.

Figure 8:
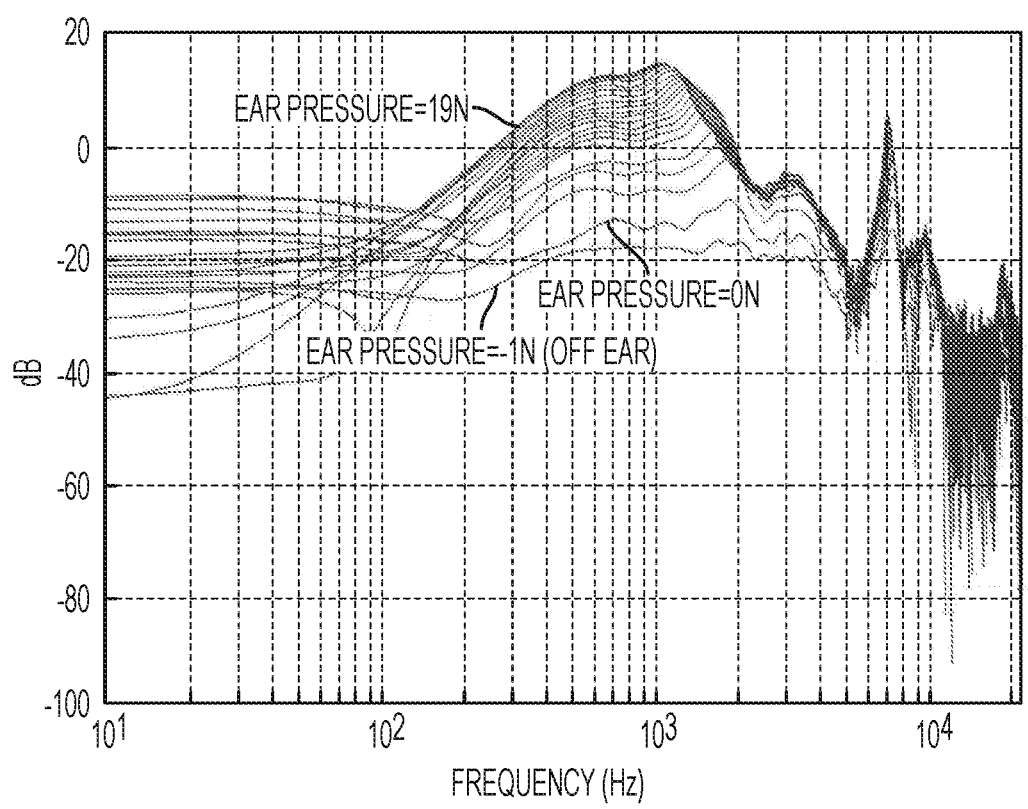
FIG. 8 is a graph of a response as a function of frequency for different levels of ear pressure according to one embodiment of the disclosure.

FIG. 8 is a graph of response SE(z) as a function of frequency for different levels of ear pressure according to one embodiment of the disclosure. As illustrated in FIG. 7, as the pressure is increased between the mobile device and the user's ear, the response SE(z) increases in magnitude in the middle frequency ranges of the graph, which correspond to frequencies at which most of the energy for speech is located. The graphs shown in FIGS. 7 and 8 may be determined for individual mobile device designs using either a computer model, or a mock-up of a simulated user's head that allows adjustment of contact pressure between the user's ear and mobile device, which may also have a measurement microphone in simulated ear canal.

In general, ANC operates properly when the user's ear is coupled to the speaker. Because the speaker may be able to only generate a certain output level, such as 80 dB sound pressure level (SPL) in a closed cavity, once the mobile device is no longer in contact with the user's ear, the anti-noise signal may be ineffective and muted. At high coupling between the user's ear and the mobile device, such as when a large force is applied between the mobile device and the user's ear, the higher-frequency energy, such as between 2 kHz and 5 kHz, may be attenuated, which may cause noise boost due to response W(z) not adapting to the attenuated condition of the higher frequencies. When the ear pressure is increased, the anti-noise signal may not be adapted to cancel energies at the higher frequencies. The response $W_{ADAPT}(z)$ may then be reset to a predetermined value, and adaptation of response $W_{ADAPT}(z)$ may be frozen, such as by holding the coefficients of response $W_{ADAPT}(z)$ at constant predetermined values. Alternatively, the overall level of the anti-noise signal may be attenuated, or a leakage of response $W_{ADAPT}(z)$ of the adaptive filter 632B may be increased. Leakage of response $W_{ADAPT}(z)$ of the adaptive filter 632B may be provided by having the coefficients of response $W_{ADAPT}(z)$ return to a flat frequency response or a fixed frequency response.

Referring back to FIG. 6, when the comparator 642 indicates that the degree of coupling between the user's ear and mobile device has been reduced below a first, low pressure, threshold, the ear pressure response logic 638 may stop adaptation of the W coefficient control 631, and the amplifier 611 may be disabled to mute the anti-noise signal. When the comparator 644 indicates that the coupling between the user's ear and the mobile device has increased above a second, high pressure, threshold, the ear pressure logic 638 may increase leakage of the W coefficient control 631 or reset response $W_{ADAPT}(z)$ and freeze adaptation of response $W_{ADAPT}(z)$.

Alternatively, the ear pressure indicator 637 may be a multi-valued or continuous indication of different ear pressure levels, and the actions above may be replaced by applying an attenuation factor to the anti-noise signal in conformity with the level of ear pressure, so that when the ear pressure passes out of the normal operating range, between the first threshold and the second threshold, the anti-noise signal level is also attenuated by lowering the gain of the amplifier 611.

In one embodiment, the response $W_{FIXED}(z)$ of the fixed filter 632A may be trained for high ear pressure. Then, the adaptive response of the adaptive filter 632B, response $W_{ADAPT}(z)$, may be allowed to vary with ear pressure changes, up to the point that contact with the ear is minimal, at which point the adapting of response W(z) may be halted and the anti-noise signal may be muted, or the pressure on the ear is over a high threshold, at which time response $W_{ADAPT}(z)$ may be reset and adaptation of response $W_{ADAPT}(z)$ may be frozen, or the leakage may be increased. Additional details regarding ANC operation are disclosed in U.S. patent application Ser. No. 13/310,380 entitled "Ear-Coupling Detection and Adjustment of Adaptive Response in Noise-Canceling in Personal Audio Devices," which is hereby incorporated by reference.

Figure 9:
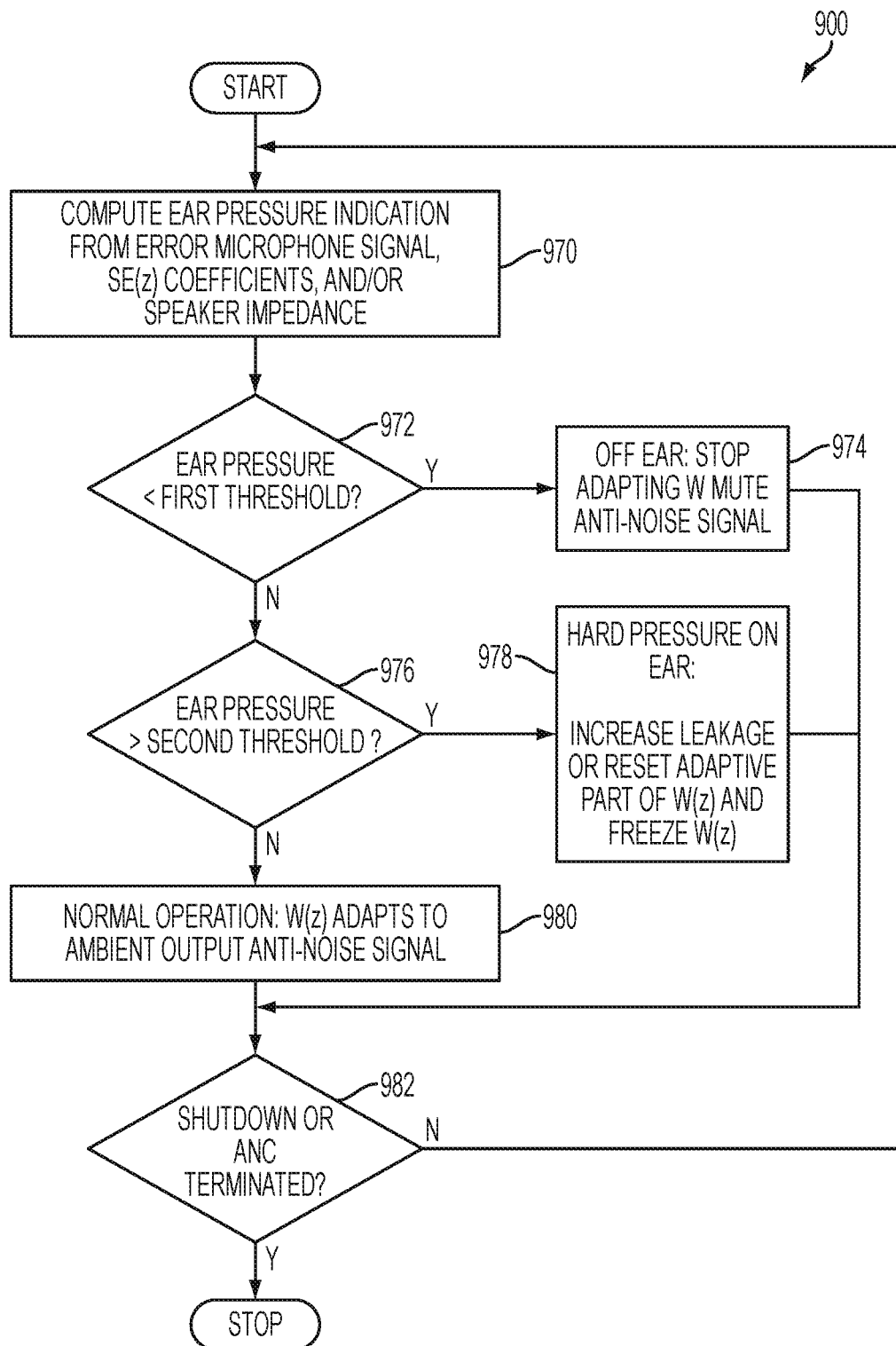
FIG. 9 is a flow chart illustrating a method for adapting adaptive noise cancellation algorithms based on ear pressure according to one embodiment of the disclosure.

FIG. 9 is a flow chart illustrating a method for adapting adaptive noise cancellation algorithms based on ear pressure according to one embodiment of the disclosure. A method 900 begins at block 970 with computing an ear pressure indication from at least one of the error microphone signal, the SE(z) coefficients, and/or the speaker impedance. At block 972, it is determined if the ear pressure is lower than a first threshold. If so, an off-ear event is detected, and the method 900 continues to block 974 to stop adapting response W(z) and/or mute the anti-noise signal. If not, the method 900 continues to block 976.

At block 976, it is determined whether the ear pressure is above a second threshold, higher than the first threshold. If so a hard-pressure event is detected, and the method 900 continues to block 978 to increase leakage of the response W(z) and/or reset and freeze the adaptive portion of response W(z). If not, then normal operation is continued at block 980, during which response W(z) adapts to the ambient audio environment and the anti-noise signal is output to the speaker.

At block 982, it is determined whether the ANC is terminated or the mobile device is shut down. If not, then the method 900 repeats, such as by returning to block 970 and repeating blocks 972 and/or 976. If the determination is yes at block 982, then the method 900 terminates.

As described above, a speaker impedance may be monitored to determine information regarding objects in proximity to a speaker, such as information regarding a mobile device containing the speaker. With regard to FIG. 1 and FIG. 2, the speaker 104 is described as having an impedance 206 proportional to loading of the acoustic sound field 150. The loading of the acoustic sound field 150 may increase or decrease relative to objects in proximity to the speaker 104 that alter the acoustic sound field 150, such as by increasing the impedance 206. For example, when a user places a mobile device containing the speaker 104 near the user's ear, the impedance 206 may increase, and the impedance 206 may decrease as the mobile device is removed from the user's ear. This change in impedance is illustrated with reference to FIG. 3. During the time period 314, the current line 302, and thus speaker impedance, increases proportional to increasing pressure applied by the user to place the mobile device against the user's ear. During time period 316, the user removes the mobile device from his/her ear resulting in a decrease in the current line 302, and thus speaker impedance.

An impedance of a speaker in a mobile device may be monitored, such as by using the apparatus of FIG. 2, to determine when a mobile phone is on-ear or off-ear. Such a determination may be useful in that the speaker, a necessary component of a mobile device, particularly a mobile phone, may be used for proximity detection. The speaker may thus be used in combination with, or as a replacement for, a conventional optical proximity detector of a mobile device. Removing the optical proximity detector may reduce costs of manufacturing the mobile device and allow for smaller, thinner construction of the mobile device. One method of detecting mobile device proximity is described with reference to FIG. 10.

Figure 10:
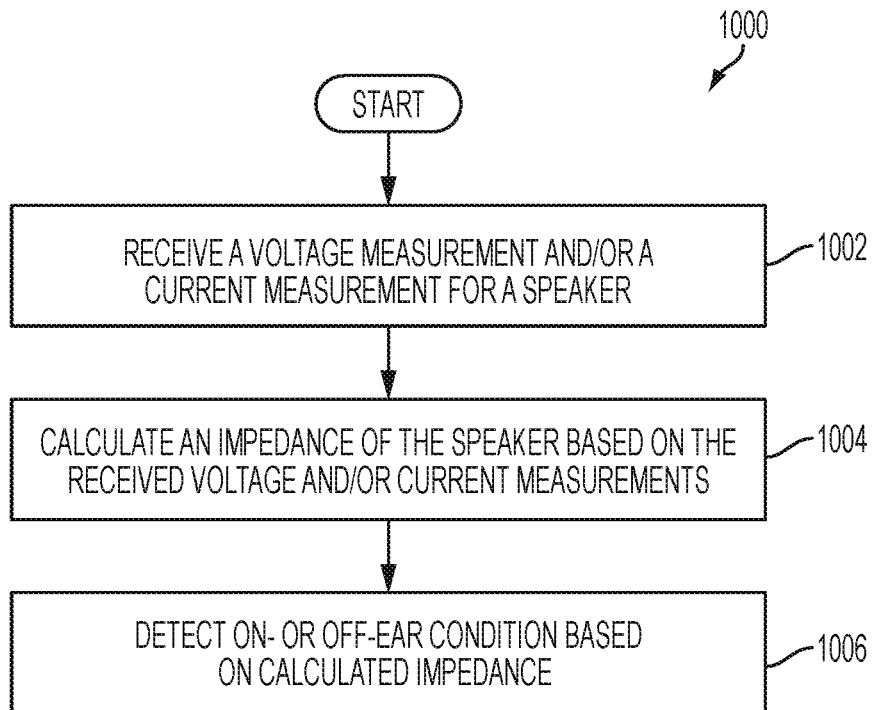
FIG. 10 is a flow chart illustrating an example method for detecting on- or off-ear condition based on a measured voltage and/or current value of the speaker according to one embodiment of the disclosure.

FIG. 10 is a flow chart illustrating an example method for detecting on-ear and off-ear conditions of a mobile device according to one embodiment of the disclosure. A method 1000 may begin at block 1002 with receiving, at a processor, a voltage measurement and/or a current measurement for a speaker. In some embodiments, the measurements may be performed during output of audio by the speaker. In some embodiments, the measurements may be performed while outputting an inaudible test tone signal to the speaker, which may be output to the speaker during the output of audio. Then, at block 1004, the method 1000 may continue with calculating an impedance of the speaker based, at least in part, on the received voltage measurement and the received current measurement. Next, at block 1006, the method 1000 may continue with detecting, based at least in part on the calculated impedance of block 1004, when the speaker is removed from an ear of the user.

Figure 11:
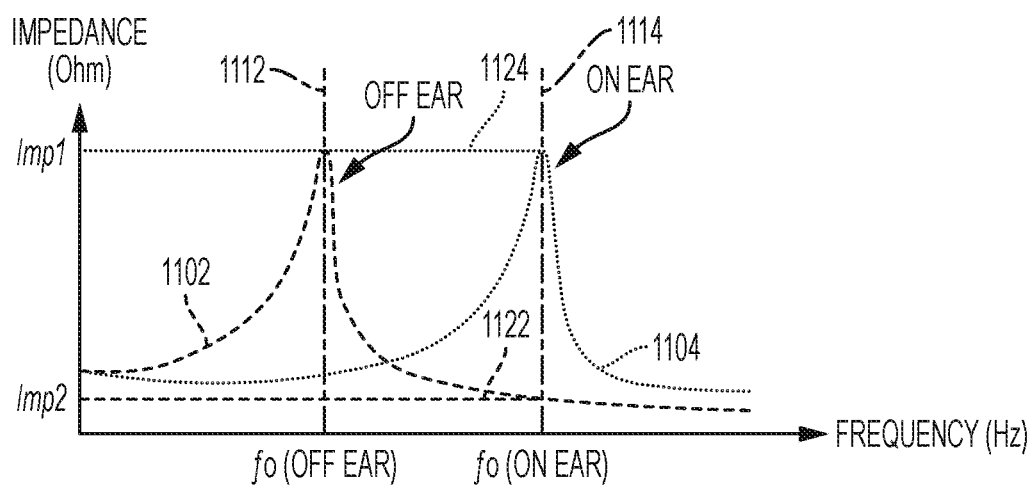
FIG. 11 is a graph illustrating an example impedance curve for a speaker in on- and off-ear conditions according to one embodiment of the disclosure.

One example impedance curve for a speaker, such as a speaker in a mobile device, is shown in FIG. 11. A line 1102 shows impedance as a function of frequency for a speaker that is not in proximity to another object, such as when the mobile device is off-ear. A line 1104 shows an impedance as a function of frequency for a speaker that is in proximity to another object, such as when the mobile device is on-ear. The impedance of the speaker at frequency $f_0$(ONear) 1114 when the speaker is on ear may be impedance level 1124; the impedance of the speaker at frequency $f_0$(ONear) 1114 when the speaker is off-ear may be impedance level 1122. The frequencies 1112 and 1114 correspond to resonance frequencies for the speaker at off-ear and on-ear conditions. The impedance at a test tone frequency may be used to determine whether a resonance frequency of the speaker is at a frequency corresponding to an on- or off-ear condition. Thus, the proximity of the mobile device to another object, such as the user's ear, may be detected by measuring a voltage and/or a current of the speaker and calculating an impedance at one or more frequencies. In one embodiment, the calculated impedance from the voltage and/or current measurements may be used to determine a resonance frequency of the speaker, and a change in the resonance frequency detected to determine an on- or off-ear condition.

To assist in determining the on- or off-ear condition, a small level test tone signal may be injected at frequency $f_0$(ONear) 1114. The test tone signal may be inaudible, such as being at an amplitude and/or frequency generally undetectable to the human ear. A difference in impedance at frequency $f_0$(ONear) 1114 may be measured and used to determine the on/off ear condition. For example, as described with reference to block 1002 of FIG. 10, a small level test tone signal may be output to the speaker at frequency $f_0$(ONear) 1114. The small level signal may be, for example, a test tone injected into the speaker at a level between approximately −30 decibels full scale (dBFS) and −40 decibels full scale (dBFS). The current and/or voltage measurements at block 1002 of FIG. 10 may be performed while outputting this test signal simultaneously with or separate from audio playback through the speaker.

The current and/or voltage measurements may be used to calculate an impedance at block 1004 of FIG. 10. The impedance may be calculated from Ohm's law as:

$$\text{Impedance} = \frac{V_{meas}}{I_{meas}},$$

where $V_{meas}$ and $I_{meas}$ are a measured voltage and a measured current, respectively, of the speaker. In some embodiments, the impedance may be calculated using filters. For example, the voltage and current values may be applied to a bandpass filter and/or a lowpass filter as part of the impedance calculation. According to one embodiment, the impedance may be calculated using filters as:

$$\text{Impedance} = \frac{|LPF(BPF(V_{mon}))|}{|LPF(BPF(I_{mon}))|},$$

where $V_{mon}$ is a monitored voltage of a speaker, $I_{mon}$ is a monitored current of a speaker, BPF represents a bandpass filter (BPF) centered at the frequency of the test tone signal, such as frequency $f_0$(ONear) 1114, and where LPF represents a lowpass filter (LPF) to average the monitored voltage $V_{mon}$ and current $I_{mon}$. Although impedance calculations at the frequency $f_0$(ONear) 1114 are described above, other frequencies may be used for calculating impedance in a similar manner, such as the frequency $f_0$(OFFear) 1112. The frequencies 1112 and 1114 are thus both examples of a first frequency that may be applied to a speaker as part of a test tone for determining an impedance of the speaker.

The calculated impedance, which may be calculated according to one of the equations above or another equation, may be used to determine when the mobile device is on- or off-ear. For example, block 1006 of FIG. 10 may include detecting the on- or off-ear condition by determining whether the calculated impedance of block 1004 is closer to level 1124 or closer to level 1122. An impedance that is closer to level 1122 than level 1124 may indicate an off-ear condition, whereas an impedance that is closer to level 1124 than level 1122 may indicate an on-ear condition. Determining whether the impedance is closer to level 1122 or level 1124 may be performed by comparing the impedance with a threshold impedance level. The threshold impedance level may be selected, for example, as a level halfway between the impedance level 1124 and the impedance level 1122. The calculated impedance of block 1004 may be compared with the threshold level to determine whether the calculated impedance exceeds the threshold level. If the threshold level is exceeded by the calculated impedance, then the mobile device may be determined to be on-ear, whereas if the threshold level is not exceeded by the calculated impedance, then the mobile device may be determined to be off-ear. In some embodiments, the threshold level may be at a different level than the midway point between the levels 1122 and 1124.

Detection of the on- or off-ear condition may trigger an event to occur on the mobile device. For example, adaptive noise cancellation (ANC) may be turned on and off with the on- and off-ear conditions. As another example, a display screen of the mobile device may be turned off when the on-ear condition is detected. In some embodiments, the action taken when the on- and off-ear condition is determined may depend in part on other conditions. For example, when the on-ear condition is detected, the display screen may be turned off only if an active telephone call is in progress.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   outputting, by a processor, a test tone to a speaker at a first frequency;
   receiving, by the processor, at least one of a voltage measurement and a current measurement for a speaker after outputting the test tone;
   calculating, by the processor, an impedance of the speaker at the first frequency based, at least in part, on the received at least one of a voltage measurement and a current measurement; and
   detecting, by the processor based at least in part on the calculated impedance, when the speaker is removed from an ear of a user by determining that the calculated impedance at the first frequency is above a threshold impedance level.

2. The method of claim 1, wherein the received at least one of a voltage measurement and a current measurement comprises both a voltage measurement and a current measurement, and wherein the step of calculating the impedance of the speaker comprises:
   applying a bandpass filter to the voltage measurement and the current measurement, wherein the bandpass filter is centered at the first frequency of the test tone;
   applying a low pass filter to the result of bandpass filtering the voltage measurement and the current measurement; and
   dividing the result of the low pass filtering of the bandpass filtered voltage measurement by the result of the low pass filtering of the bandpass filtered current measurement.

3. The method of claim 1, wherein the step of detecting when the speaker is removed from the ear of the user comprises determining a change in an impedance curve of the speaker based, at least in part, on the received at least one of a voltage measurement and a current measurement.

4. The method of claim 1, further comprising adjusting an adaptive noise cancellation (ANC) algorithm based, at least in part, on the calculated impedance.

5. The method of claim 4, wherein the step of adjusting the adaptive noise cancellation (ANC) algorithm comprises disabling the adaptive noise cancellation (ANC) algorithm when the speaker is detected as removed from the ear of the user.

6. The method of claim 1, wherein the step of determining that the calculated impedance at the first frequency is above a threshold impedance level comprises determining a change in a resonance frequency of the speaker that indicates the speaker is removed from the ear of the user.

7. The method of claim 1, wherein the step of calculating the impedance of the speaker comprises applying one or more filters to the received at least one of a voltage measurement and a current measurement for the speaker.

8. The method of claim 1, further comprising turning off a display screen of a device comprising the speaker when the speaker is detected as removed from the ear of the user.

9. An apparatus, comprising:
   a speaker;
   an amplifier coupled to the speaker;
   a processor coupled to the amplifier, in which the processor is configured to execute steps comprising:
      outputting a test tone to the speaker at a first frequency;
      receiving at least one of a voltage measurement and a current measurement for the speaker during output of audio by the speaker;
      calculating an impedance of the speaker at the first frequency based, at least in part, on the received at least one of a voltage measurement and a current measurement; and
      detecting, based at least in part on the calculated impedance, when the speaker is removed from an ear of a user by determining that the calculated impedance at the first frequency is above a threshold impedance.

10. The apparatus of claim 9, wherein the received at least one of a voltage measurement and a current measurement comprises both a voltage measurement and a current measurement, and wherein the step of calculating the impedance of the speaker comprises:
    applying a bandpass filter to the voltage measurement and the current measurement, wherein the bandpass filter is centered at the first frequency of the test tone;
    applying a low pass filter to the result of bandpass filtering the voltage measurement and the current measurement; and
    dividing the result of the low pass filtering of the bandpass filtered voltage measurement by the result of the low pass filtering of the bandpass filtered current measurement.

11. The apparatus of claim 9, wherein the step of detecting when the speaker is removed from the ear of the user comprises determining a change in an impedance curve of the speaker based, at least in part, on the received at least one of a voltage measurement and a current measurement.

12. The apparatus of claim 9, wherein the processor is further configured to perform steps comprising adjusting an adaptive noise cancellation (ANC) algorithm based, at least in part, on the calculated impedance.

13. The apparatus of claim 12, wherein the step of adjusting the adaptive noise cancellation (ANC) algorithm comprises disabling the adaptive noise cancellation (ANC) algorithm when the speaker is detected as removed from the ear of the user.

14. The apparatus of claim 9, in which the apparatus is a mobile device.

15. The apparatus of claim 9, wherein the step of determining that the calculated impedance at the first frequency is above a threshold impedance level comprises determining a change in a resonance frequency of the speaker that indicates the speaker is removed from the ear of the user.

16. The apparatus of claim 9, wherein the step of calculating the impedance of the speaker comprises applying one or more filters to the received at least one of a voltage measurement and a current measurement for the speaker.

17. The apparatus of claim 9, further comprising a display screen coupled to the processor, wherein the processor is further configured to perform steps comprising turning off a display screen of a device comprising the speaker when the speaker is detected as removed from the ear of the user.

18. A computer program product, comprising:
a non-transitory computer readable medium comprising code to execute the steps comprising:
outputting a test tone to a speaker at a first frequency;
receiving at least one of a voltage measurement and a current measurement from a speaker during output of audio by the speaker;
calculating an impedance of the speaker at the first frequency based, at least in part, on the received at least one of a voltage measurement and a current measurement; and
detecting, based at least in part on the calculated impedance, when the speaker is removed from an ear of a user by determining that the calculated impedance at the first frequency is above a threshold impedance level.

19. The computer program product of claim 18, wherein the step of calculating the impedance of the speaker comprises:
applying a bandpass filter to the received at least one of a voltage measurement and a current measurement, wherein the bandpass filter is centered at the first frequency of the test tone;
applying a low pass filter to the result of bandpass filtering the voltage measurement and the current measurement; and
dividing the result of the low pass filtering of the bandpass filtered voltage measurement by the result of the low pass filtering of the bandpass filtered current measurement.

20. The computer program product of claim 18, wherein the step of detecting when the speaker is removed from the ear of the user comprises determining a change in an impedance curve of the speaker based, at least in part, on the received at least one of a voltage measurement and a current measurement.

* * * * *